United States Patent [19]

Hollis et al.

[11] Patent Number: 5,128,100
[45] Date of Patent: Jul. 7, 1992

[54] PROCESS FOR INHIBITING BACTERIAL ADHESION AND CONTROLLING BIOLOGICAL FOULING IN AQUEOUS SYSTEMS

[75] Inventors: C. George Hollis; Percy A. Jaquess, both of Memphis, Tenn.

[73] Assignee: Buckman Laboratories, Intl., Inc., Memphis, Tenn.

[21] Appl. No.: 746,159

[22] Filed: Aug. 14, 1991

Related U.S. Application Data

[63] Continuation of Ser. No. 420,326, Oct. 12, 1989, abandoned.

[51] Int. Cl.⁵ ............................................... C02F 5/12
[52] U.S. Cl. ...................................... 422/14; 210/696; 210/698; 210/701; 210/753; 210/754; 210/755; 210/764; 252/8.555; 252/388; 252/394; 252/399; 252/405; 422/16
[58] Field of Search ............... 422/14, 16; 252/8.555, 252/388, 394, 399, 405; 210/696, 698, 701, 753, 754, 755, 764

[56] References Cited

U.S. PATENT DOCUMENTS

| | | |
|---|---|---|
| Re. 28,807 | 5/1976 | Panzer et al. . |
| Re. 28,808 | 5/1976 | Panzer et al. . |
| 2,261,002 | 10/1941 | Ritter et al. . |
| 2,271,378 | 1/1942 | Searle . |
| 3,489,663 | 1/1970 | Bayer et al. . |
| 3,771,989 | 11/1973 | Pera et al. . |
| 4,018,592 | 4/1977 | Buckman et al. . |
| 4,054,542 | 10/1977 | Buckman et al. . |
| 4,089,977 | 5/1978 | Green et al. . |
| 4,111,679 | 9/1978 | Shair et al. . |
| 4,506,081 | 3/1985 | Fenyes et al. . |
| 4,581,058 | 4/1986 | Fenyes et al. . |

Primary Examiner—Timothy M. McMahon
Attorney, Agent, or Firm—Finnegan, Henderson, Farabow, Garrett & Dunner

[57] ABSTRACT

A process for inhibiting the adhesion of bacterial cells to solid surfaces in aqueous systems and thus controlling biological fouling comprising adding a water-soluble ionene polymer to the aqueous systems in an amount ranging from about 0.5 ppm to about 50 ppm based on the weight of aqueous liquid in the system.

16 Claims, 1 Drawing Sheet

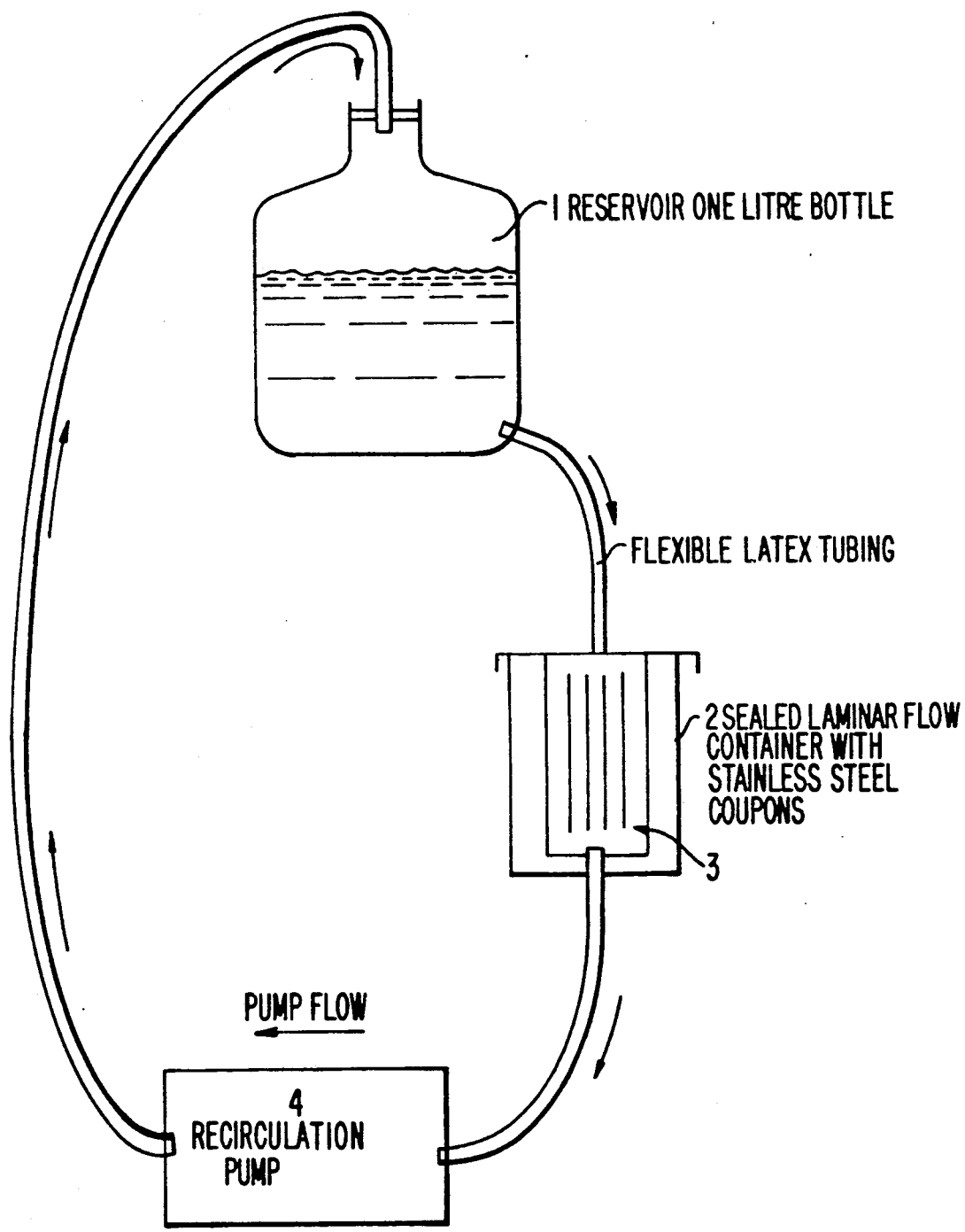

ND CONTROLLING BIOLOGICAL
PROCESS FOR INHIBITING BACTERIAL ADHESION AND CONTROLLING BIOLOGICAL FOULING IN AQUEOUS SYSTEMS

This application is a continuation of application Ser. No. 07/420,326 filed Oct. 12, 1989, now abandoned.

BACKGROUND OF THE INVENTION

This invention relates to methods for the prevention of the adhesion of bacterial cells to surfaces in aqueous systems by treating the water in contact with such surfaces with very low concentrations of a water-soluble ionene polymer. More particularly, it relates to methods for controlling the biological fouling of such surfaces by inhibiting the formation of a bacterial biofilm that is the common precursor to such fouling.

Biological fouling of surfaces is a serious economic problem in many commercial and industrial aqueous processes and water-handling systems. The fouling is caused by the buildup of microorganisms, macroorganisms, extracellular substances, and dirt and debris that become trapped in the biomass. The organisms involved include bacteria, fungi, yeasts, algae, diatoms, protozoa, macroalgae, barnacles, and small mollusks like Asiatic clams. If not controlled, the biofouling caused by these organisms can interfere with process operations, lower the efficiency of processes, waste energy, and reduce product quality.

For example, cooling water systems used in power-generating plants, refineries, chemical plants, air-conditioning systems, and other commercial and industrial operations frequently encounter biofouling problems. Such water systems are commonly contaminated with airborne organisms entrained from cooling towers as well as waterborne organisms from the system's makeup water supply. The water in such systems is generally an excellent growth medium for these organisms, with aerobic and heliotropic organisms flourishing on the towers and other organisms colonizing and growing in such areas as the tower sump, pipelines, heat exchangers, etc. If not controlled, the biofouling resulting from such growth can plug the towers, block pipelines, and coat heat-transfer surfaces with layers of slime, and thereby prevent proper operation and reduce cooling efficiency.

Industrial processes subject to problems with biofouling include those used for the manufacture of pulp, paper, paperboard, and textiles, particularly water-laid nonwoven textiles. For example, paper machines handle very large volumes of water in recirculating systems called "white water systems." The furnish to a paper machine typically contains only about 0.5% of fibrous and nonfibrous papermaking solids, which means that for each ton of paper almost 200 tons of water pass through the headbox, most of it being recirculated in the white water system.

These water systems provide excellent growth media for microorganisms, which can result in the formation of microbial slime in headboxes, waterlines, and papermaking equipment. Such slime masses not only can interfere with water and stock flows, but when they break loose they can cause spots, holes, and bad odors in the paper as well as web breaks that cause costly disruptions in paper machine operations.

To control biological fouling, it has been common in the art to treat the affected water systems with certain chemical substances in concentrations sufficient to kill or greatly inhibit the growth of the causative organisms. For example, chlorine gas and hypochlorite solutions made with the gas have long been added to water systems to kill or inhibit the growth of bacteria, fungi, algae, and other troublesome organisms. However, chlorine compounds are not only damaging to materials of construction, they also react with organics to form undesirable substances in effluent streams, such as carcinogenic chloromethanes and chlorinated dioxins.

Certain organic compounds, such as methylenebis(thiocyanate), dithiocarbamates, haloorganics, and quaternary ammonium surfactants, have also been used. While many of these are quite efficient in killing microorganisms or inhibiting their growth, they also tend to be toxic or harmful to humans, animals, or other non-target organisms.

Scientific studies have shown that the first stage of biological fouling in aqueous systems is generally the formation of a thin bacterial film on the surface exposed to the water. The bacteria initiate the attachment and early colonization of the surface and modify it in a manner that favors the development of the more complex community of organisms that make up the advanced fouling of the surface. For example, P. E. Holmes (Appl. Environ. Microbiol. 52(6):1391-3, Dec. 1986) found that bacterial growth on the submerged surfaces of vinyl swimming pool liners was a significant factor in the fouling of these surfaces by algae. When in association, the bacteria attached to the vinyl within 24 hours and the algae within 48 hours. In the absence of bacteria, however, one species of algae did not attach even after 7 days and another algae species did begin to attach by 7 days but in numbers a order of magnitude lower than those of the bacteria-contaminated counterpart. A general review of the mechanisms of biological fouling and the importance of the bacterial biofilm as the initial stage is given by C. A. Kent in "Biological Fouling: Basic Science and Models" (in Melo, L. F., Bott, T. R., Bernardo, C. A. (eds.), Fouling Science and Technology, NATO ASI Series, Series E, Applied Sciences: No. 145, Kluwer Acad. Publishers, Dordrecht, The Netherlands, 1988).

Based on these findings, one possible way to control the biological fouling of surfaces would be to prevent or inhibit the formation of the initial bacterial biofilm. This can be done, of course, by use of bactericidal substances, but they generally have the disadvantages mentioned above. It is therefore an object of the present invention to provide a method of controlling the biological fouling of surfaces that obviates the disadvantages of the prior art. Other objects and advantages of this invention will become apparent from a reading of the specifications and appended claims.

SUMMARY OF THE INVENTION

The inventors have discovered a new method of treating aqueous systems and surfaces in the aqueous systems that prevents or inhibits the adhesion of bacterial cells to the surfaces and thereby controls the biological fouling of the surfaces. The method comprises adding to the aqueous system a water-soluble ionene polymer in an amount ranging from about 0.1 ppm to about 50 ppm preferably from about 0.1 ppm to 10 and more preferably from about 0.5 to 5 based on the weight of the aqueous liquid in the system. This method effectively inhibits the adhesion of the bacterial cells to exposed surfaces without killing the fouling organisms and also without harming non-target organisms. In addition, the method of the present invention advantageously does not cause the formation of harmful substances in the effluent from the systems treated.

BRIEF DESCRIPTION OF THE DRAWING

FIG. 1 is a flow diagram of a continuous Flow Pump System.

DETAILED DESCRIPTION OF THE INVENTION

Ionene polymers as used in this invention are cationic polymers in which a substantial proportion of the atoms providing the positive charge are quaternized nitrogens located in the main polymeric chain or backbone rather than in pendant groups. The polymers of this invention can be derived from the condensation polymerization of an organic dihalo alkyl compound and/or an epihalohydrin with one or more amines, amino compounds or ammonia.

The alkyl groups of the dihalo alkyl compound have from 1 to about 20 carbon atoms, and the halogen is selected from the group consisting of bromine, chlorine, and iodine. Suitable organic dihalo alkyl compounds include 1,2-dichloroethane, 1,3-dichloropropane, 1,4-dichlorobutane, 1,5-dichloropentane, 1-6-dichlorohexane, and 1,1'-oxybis(2-chloroethane). Suitable epihalohydrins include epichlorohydrin and epibromohydrin.

The alkyl groups of the amines or amino compounds have from 1 to about 20 carbon atoms. Suitable amines or amino compounds include dialkylamino trialkylamines, dialkylamino alkylamines, alkyldiamines, dialkylamines and ditertiary amines.

The efficacy of ionene polymers for the purposes of this invention are related more to the structure of the polymer than to its molecular weight. Thus, ionene polymers with molecular weights ranging from about 1,000 to 2,000,000 are suitable, preferably from about 1,000 to 100,000.

The ionene polymers used in this invention are commercially available or are easily synthesized from commercially available raw materials. The processes for making such polymers have been described in U.S. Pat. No. 2,261,002 to Ritter, U.S. Pat. No. 2,271,378 to Searle, U.S. Pat. No. 3,489,663 to Bayer et al., U.S. Pat. Reissue Nos. 28,807 and 28,808 to Panzer, U.S. Pat. No. 4,054,542 to Buckman et al., U.S. Pat. No. 4,506,081 to Fenyes et al. and U.S. Pat. No. 4,581,058 to Fenyes et al.

The polymers of this invention are manufactured and sold by a number of manufacturers. Some examples of ionene polymers that are manufactured and sold by Buckman Laboratories, Inc. under various trademarks and that have been found especially effective in the practice of this invention are:

N,N,N',N'-Tetramethyl-1,2-ethanediamine polymer with 1,1'-oxybis[2-chloroethane](CAS Reg. No. 31075-24-8)

N,N,N',N'-Tetramethyl-1,2-ethanediamine polymer with (chloromethyl)oxirane (CAS Reg. No. 25988-98-1)

N-Methylmethanamine polymer with (chloromethyl)oxirane (CAS Reg. No. 25988-97-0)

1,1'-(Methylimino)bis[3-chloro-2-propanol] polymer with N,N,N',N'-tetramethyl-1,2-ethanediamine (CAS Reg. No. 68140-76-1)

These polymers have been found to be essentially nonfoaming in water, non-irritating to the skin, and extremely low in toxicity to warm-blooded animals. Such polymers have been shown to be microbicidal at certain levels and under certain conditions as evidenced in the following U.S. Pat. Nos.: 3,771,989 to Pera et al., 4,018,592 to Buckman et al., 4,054,542 to Buckman et al, 4,506,081 to Fenyes et al., 4,111,679 to Shair et al, 4,089,977 to Green et al and 4,140,798 to Merianos et al. While these polymers are bactericidal at concentrations above certain threshold levels, the inventors have found that they are effective in preventing the adhesion of bacteria even at concentrations substantially below these threshold levels.

In order to disclose the nature of the invention more clearly, the following illustrative examples will be given. It is to be understood, however, that the invention is not limited to the specific conditions or details set forth in the examples which follow.

The ionene polymers of this invention were evaluated for their effectiveness in preventing the adhesion of bacterial cells by use of closed continuous circulation devices set up as shown in FIG. 1. Each setup consisted of a reservoir 1, a laminar flow container 2, in which was mounted rectangular Type 304 stainless steel coupons 3, and a centrifugal circulation pump 4. All components in the loop were connected as shown by means of flexible latex tubing. The metal coupons in the container were fastened in place so that when liquid was circulated in the loop, laminar flow of the liquid over the surface of the coupons were obtained. In operation, an aqueous solution containing bacterial nutrients was placed in the reservoir and circulated from the reservoir to the laminar flow container, then through the pump and back to the reservoir. The circulating liquid was inoculated with a measured amount of a bacterial culture, and appropriate concentrations of the products to be tested were added to the liquid.

For the tests, an aqueous growth medium known as Bushnell-Haas Mineral Solution was prepared and modified with peptone, according to the following formula:

| Magnesium sulfate | 0.2 gram |
| Calcium chloride | 0.02 gram |
| Monopotassium phosphate | 1.0 gram |
| Dipotassium phosphate | 1.0 gram |
| Ammonium nitrate | 1.0 gram |
| Ferric chloride | 0.05 gram |
| Bacto peptone | 0.250 gram |
| Deionized water | 1.0 liter |

Final pH 7.0±0.2 at 25° C.
All ingredients were dissolved in the deionized water and sterilized in an autoclave for 20 minutes at 120° C.

The inoculum for the tests was prepared by culturing known adherent species of bacteria on Tryptic Soy Agar plates. These plates were washed with normal saline solution (0.85%) and diluted appropriately to $1 \times 10^9$ cfu/mL (colony forming units per milliliter). This mixed stock inoculum was added to each reservoir in an amount that provided an initial concentration of $1 \times 10^6$ cfu/mL in the circulating liquid.

Each test was run with continuous circulation of the treated liquid for seven days. Then the system was shut down, and the stainless steel coupons were removed from the container and checked for adherent bacterial cells. Bacterial colony counts were also run on the circulating aqueous liquid by conventional Petri dish plate counts procedures in order to determine any inhibitory effect of the polymers on the growth of the bacteria in the liquid itself.

Determination of the adherent cells on the coupons was made by use of the reagent 2-(p-iodophenyl)-3-(p-nitrophenyl)-5-phenyl tetrazolium chloride, also known as INT. It is known that living, respiring bacterial cells will reduce INT and deposit red formazan crystals inside the cells. These crystals can then be extracted and measured quantitatively by visible light spectrophotometry.

At the end of the seven day test period, the stainless steel coupons were removed from the recirculating loop system, rinsed with water, and immersed for 30 minutes in a 0.02% aqueous solution of INT. The coupons were then removed from the solution and the colored formazan crystals on each coupon were extracted with 5.0 mL of methylene chloride. The resulting solution was filtered through a 0.45-micron pore size filter to remove cellular debris, the filtered solution was transferred to standard 3-mL cuvettes, and the optical transmittance of the solution at 490 nm was measured by means of a spectrophotometer. Since the transmittance is inversely related to the amount of cellular mass on the coupon, the higher the transmittance the lower would be the amount of bacterial cells adhering to the coupons.

EXAMPLES 1 TO 4

The following four polymer products were evaluated for their effectiveness in preventing bacterial adhesion by two known bacterial adherent species, *Klebsiella oxytoca* and *Pseudomonas aeruginosa*, by use of the procedures outlined in the foregoing paragraphs:

Product A: N,N,N',N'-Tetramethyl-1,2-ethanediamine polymer with 1,1'-oxybis[2-chloroethane], 60% (w/w) aqueous solution, 3,000 average molecular weight.

Product B: N,N,N',N'-Tetramethyl-1,2-ethanediamine polymer with (chloromethyl)oxirane, 60% (w/w) aqueous solution, 3,000 average molecular weight.

Product C: N-Methylmethanamine polymer with (chloromethyl)-oxirane, 60% (w/w) aqueous solution, 3,000 average molecular weight.

Product D: 1,1'-(Methylimino)[3-chloro-2-propanol] polymer with N,N,N',N'-tetramethyl-1,2-ethanadiamine, 25% (w/w) aqueous solution, 60,000 average molecular weight.

For each polymer, four separate circulating systems were set up. One liter of the sterilized Bushnell-Haas Mineral Solution was added to each reservoir, the liquid was inoculated with the bacterial culture as described previously, the amount of polymer product indicated below was added, the circulation pump was started, and circulation of the liquid was continued for seven days. For each polymer, the following weight for weight concentrations were used: 0 ppm ("Control"), 1.0 ppm, 5.0 ppm and 10 ppm.

The results, which are summarized in Tables 1 through 4, show that these ionene polymers, when used in accordance with the present invention, provide major reductions in the adhesion of bacterial cells to the stainless steel coupons, as evidence by the greater transmittance (lower amounts of formazan) with increasing dosages of the polymers. The near 100% transmittance at the 10 ppm levels indicates the virtual absence of formazan and thus the virtual absence of bacterial cells on the stainless steel coupons. In addition, the results indicate that, even at the maximum concentrations tested, the fouling organisms in the circulating aqueous liquid were not killed and thus the total bacterial population was not affected.

This showing demonstrates that polymers intended for use in the present invention can inhibit the adhesion of bacterial cells to surfaces in aqueous systems at concentrations below the toxic threshold of the polymers.

TABLE 1

| Polymer Product A | | | | |
|---|---|---|---|---|
| Dose Level, ppm | 0 | 1 | 5 | 10 |
| Bacterial Count (cfu/mL) × 10$^6$ (Aqueous phase) | 165 | 162 | 158 | 153 |
| Transmittance, % (extracted formazan) | 1 | 11 | 57 | 97 |

TABLE 2

| Polymer Product B | | | | |
|---|---|---|---|---|
| Dose Level, ppm | 0 | 1 | 5 | 10 |
| Bacterial Count (cfu/mL) × 10$^6$ (Aqueous phase) | 143 | 142 | 137 | 129 |
| Transmittance, % (extracted formazan) | 1 | 4 | 61 | 99 |

TABLE 3

| Polymer Product C | | | | |
|---|---|---|---|---|
| Dose Level, ppm | 0 | 1 | 5 | 10 |
| Bacterial Count (cfu/mL) × 10$^6$ (Aqueous phase) | 155 | 154 | 143 | 141 |
| Transmittance, % (extracted formazan) | 1 | 8 | 64 | 99 |

TABLE 4

| Polymer Product D | | | | |
|---|---|---|---|---|
| Dose Level, ppm | 0 | 1 | 5 | 10 |
| Bacterial Count (cfu/mL) × 10$^6$ (Aqueous phase) | 125 | 122 | 119 | 106 |
| Transmittance, % (extracted formazan) | 1 | 11 | 55 | 98 |

While particular embodiments of the invention have been described, it will be understood, of course, that the invention is not limited thereto since many modifications may be made, and its is, therefore, contemplated to cover by the appended claims any such modifications as fall within the true spirit and scope of the invention.

What is claimed is:

1. A process for controlling biological fouling in an aqueous system containing bacterial cells which comprises the steps of determining an amount of cationic ionene polymer effective to substantially inhibit the adhesion of bacterial cells to solid surfaces within said system without substantially killing said cells; and thereafter adding to said aqueous system said determined amount of said polymer.

2. The process of claim 1, wherein said added amount of the ionene polymer ranges from 0.1 ppm to 10 ppm.

3. The process of claim 1, wherein said added amount of the ionene polymer ranges from 0.5 ppm to 10 ppm.

4. The process of claim 1 wherein the ionene polymer has a molecular weight from 1,000 to 2,000,000.

5. The process of claim 1, wherein the ionene polymer has a molecular weight from 1,000 to 100,000.

6. The process of claim 1, wherein said added amount of ionene polymer ranges from 0.1 ppm to 50 ppm based on the weight of aqueous liquid in the system, and wherein the aqueous system is an industrial system.

7. The process of claim 1, wherein the ionene polymer is derived from a reaction of an organic dihalo alkyl compound and/or an epihalohydrin with one or more amines, amino compounds or ammonia.

8. The process of claim 7, wherein the ionene polymer is derived from a reaction of an organic dihalo alkyl compound and an epihalohydrin with one or more amines, amino compounds or ammonia or from a reaction of an organic dihalo alkyl compound with one or more amines, amino compounds or ammonia, and wherein the alkyl group of the organic dihalo alkyl compound has from 1 to 20 carbon atoms.

9. The process of claim 7, wherein the ionene polymer is derived from a reaction of an organic dihalo alkyl compound and an epihalohydrin with one or more amines, amino compounds or ammonia or from a reaction of an organic dihalo alkyl compound with one or more amines, amino compounds or ammonia, and wherein the halogen atom of the organic dihalo alkyl compound is selected from the group consisting of bromine, chlorine and iodine.

10. The process of claim 7, wherein the ionene polymer is derived from a reaction of an organic dihalo alkyl compound and an epichlorohydrin with one or more amines, amino compounds or ammonia or wherein the ionene polymer is derived from a reaction of an epichlorohydrin with one or more amines, amino compounds or ammonia, and wherein the epihalohydrin is epichlorohydrin or epibromohydrin.

11. The process of claim 7, wherein the ionene polymer is derived from a reaction of an organic dihalo alkyl compound and an epihalohydrin with one or more amines, amino compounds or ammonia or from a reaction of an organic dihalo alkyl compound with one or more amines, amino compounds or ammonia, and wherein the organic dihalo alkyl compound is 1,1'-oxybis(2-chloroethane).

12. The process of claim 7, wherein the ionene polymer is derived from a reaction of an organic dihalo alkyl compound and/or an epihalohydrin with one or more amines, amino compounds or ammonia, and wherein the amine contains alkyl groups having from 1 to 20 carbon atoms.

13. The process of claim 7, wherein the ionene polymer is derived from a reaction of an organic dihalo alkyl compound and/or an epihalohydrin with one or more amines, amino compounds or ammonia, and wherein the amine is N-methylmethanamine.

14. The process of claim 7, wherein the ionene polymer is derived from a reaction of an organic dihalo alkyl compound and/or an epihalohydrin with one or more amines, amino compounds or ammonia, and wherein the amine is N,N,N', N'-tetramethyl-1,2-ethanediamine.

15. The process of claim 1, wherein the aqueous system is a cooling water system.

16. The process of claim 1, wherein the aqueous system is a paper machine white water system.

* * * * *